US011012780B2

(12) United States Patent
Freeman

(10) Patent No.: US 11,012,780 B2
(45) Date of Patent: May 18, 2021

(54) SPEAKER SYSTEM WITH CUSTOMIZED AUDIO EXPERIENCES

(71) Applicant: Bose Corporation, Framingham, MA (US)

(72) Inventor: Eric John Freeman, Sutton, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/411,266

(22) Filed: May 14, 2019

(65) Prior Publication Data

US 2020/0366991 A1 Nov. 19, 2020

(51) Int. Cl.
G06F 3/0482 (2013.01)
H04R 5/04 (2006.01)
G06F 3/01 (2006.01)
G06F 3/16 (2006.01)

(52) U.S. Cl.
CPC .............. H04R 5/04 (2013.01); G06F 3/011 (2013.01); G06F 3/017 (2013.01); G06F 3/0482 (2013.01); G06F 3/167 (2013.01)

(58) Field of Classification Search
CPC .................................................. G06F 3/0482
USPC ....................................................... 715/700
See application file for complete search history.

(56) References Cited

U.S. PATENT DOCUMENTS

| 5,864,868 | A * | 1/1999 | Contois ................. G07F 17/305 |
| 7,028,082 | B1 * | 4/2006 | Rosenberg ............. H04H 60/02 707/999.104 |
| 8,442,239 | B2 * | 5/2013 | Bruelle-Drews .... H04B 1/3822 381/86 |
| 8,891,794 | B1 * | 11/2014 | Lin ........................ G06F 16/635 381/315 |
| 9,658,820 | B2 * | 5/2017 | Millington ............ G06F 16/638 |
| 10,175,937 | B1 * | 1/2019 | Olive ...................... G06F 3/165 |
| 10,424,292 | B1 * | 9/2019 | Thimsen ................. G10L 25/84 |
| 10,602,268 | B1 * | 3/2020 | Soto ........................ G10L 25/84 |
| 2005/0248474 | A1 * | 11/2005 | Wiser ........................ H04S 7/40 341/50 |
| 2007/0180062 | A1 * | 8/2007 | Southerland ....... H04N 21/4622 709/219 |
| 2007/0226346 | A1 * | 9/2007 | Hyvarinen .......... H04L 67/1091 709/227 |
| 2009/0328087 | A1 * | 12/2009 | Higgins ........... H04N 21/25816 725/10 |
| 2010/0031162 | A1 * | 2/2010 | Wiser ................... H04N 21/431 715/747 |

(Continued)

OTHER PUBLICATIONS

Jared Newman, "How to use Alexa Routines to make your Amazon Echo even smarter", published Dec. 17, 2018, available at <<https://www.techhive.com/article/3327501/how-to-use-alexa-routines.html>>, 13 pages (Year: 2018).*

(Continued)

Primary Examiner — Daniel Rodriguez
(74) Attorney, Agent, or Firm — Hoffman Warnick LLC

(57) ABSTRACT

Various aspects include approaches for providing customized audio experiences in a speaker system. In some implementations, computer-implemented methods of controlling a plurality of customized audio experiences for a speaker system are disclosed. In other implementations, an at-home speaker system is configured for customized audio experiences.

15 Claims, 5 Drawing Sheets

(56) References Cited

U.S. PATENT DOCUMENTS

| | | | |
|---|---|---|---|
| 2010/0286806 A1* | 11/2010 | Booth | H04R 5/04 700/94 |
| 2010/0293264 A1* | 11/2010 | Ramsay | H04L 69/18 709/223 |
| 2011/0176697 A1* | 7/2011 | Apfel | H04R 25/305 381/314 |
| 2011/0314401 A1* | 12/2011 | Salisbury | H04N 5/23216 715/771 |
| 2012/0096125 A1* | 4/2012 | Kallai | H03G 5/005 709/219 |
| 2014/0046464 A1* | 2/2014 | Reimann | H03F 3/181 700/94 |
| 2014/0297288 A1* | 10/2014 | Yu | G10L 15/30 704/275 |
| 2014/0309872 A1* | 10/2014 | Ricci | B60R 25/01 701/36 |
| 2014/0334644 A1* | 11/2014 | Selig | G06F 3/165 381/108 |
| 2015/0193196 A1* | 7/2015 | Lin | H04R 3/04 715/716 |
| 2015/0242467 A1* | 8/2015 | Bilinski | H04W 4/025 707/769 |
| 2015/0382096 A1* | 12/2015 | Lamar | H04R 1/1083 381/74 |
| 2016/0239253 A1* | 8/2016 | Staffaroni | H03G 5/025 |
| 2016/0357511 A1* | 12/2016 | Reimann | G06F 16/635 |
| 2017/0031420 A1* | 2/2017 | Wong | G06F 1/3293 |
| 2017/0194020 A1* | 7/2017 | Miller | G10L 25/51 |
| 2017/0345420 A1* | 11/2017 | Barnett, Jr. | G10L 15/22 |
| 2018/0025733 A1* | 1/2018 | Qian | G10L 25/78 704/275 |
| 2018/0242219 A1* | 8/2018 | Deluca | H04L 65/1059 |
| 2018/0255411 A1* | 9/2018 | Lin | H04R 1/1008 |
| 2018/0288161 A1* | 10/2018 | Saxena | H04W 4/029 |
| 2018/0295405 A1* | 10/2018 | Barnett, Jr. | H04N 21/414 |
| 2018/0348718 A1* | 12/2018 | Richardson | G08B 21/22 |
| 2019/0026056 A1* | 1/2019 | Wang | G06F 1/1613 |
| 2019/0174226 A1* | 6/2019 | Yang | G10L 15/28 |
| 2019/0179605 A1* | 6/2019 | Stefan | H04R 1/1041 |
| 2019/0306607 A1* | 10/2019 | Clayton | H04R 27/00 |
| 2020/0175976 A1* | 6/2020 | Rakshit | H04L 67/306 |
| 2020/0258513 A1* | 8/2020 | Smith | G10L 15/08 |
| 2020/0264835 A1 | 8/2020 | Reily et al. | |

OTHER PUBLICATIONS

Amazonforum.com, "Rename Alexa Routines", available on Jan. 2, 2019, available at <<https://www.amazonforum.com/s/question/0D54P00006zSt9NSAS/rename-alexa-routines>>, 6 pages (Year: 2019).*

Micah Singleton, "How to set up multiroom music playback with Amazon Echo", available on Jan. 17, 2019, available at <<https://www.theverge.com/2017/8/29/16219978/amazon-echo-multi-room-music-playback-how-to>>, 3 pages (Year: 2019).*

Reddit.com, "[Wishlist] Alexa, mute for an hour", available on Dec. 7, 2018, available at <<https://www.reddit.com/r/amazonecho/comments/a42397/wishlist_alexa_mute_for_an_hour/>>, 2 pages (Year: 2018).*

Tribe Tech Review, "Alexa, Get ready for Shabbos!", available on Feb. 1, 2018, available at <<https://tribetechreview.com/2018/02/01/alexa-get-ready-for-shabbat/>>, 11 pages (Year: 2018).*

* cited by examiner

SPEAKER SYSTEM WITH CUSTOMIZED AUDIO EXPERIENCES

TECHNICAL FIELD

This disclosure generally relates to speaker systems. More particularly, the disclosure relates to approaches for providing customized audio experiences to a user of a speaker system.

BACKGROUND

The proliferation of speaker systems and audio devices in the home and other environments has enabled dynamic user experiences. However, in many cases, managing these user experiences requires adjusting various settings across one or more audio devices. Managing settings for each experience can be time-consuming, and can detract from the benefits that these devices provide.

SUMMARY

All examples and features mentioned below can be combined in any technically possible way.

Various aspects include approaches for providing customized audio experiences in a speaker system. In some implementations, computer-implemented methods of controlling a plurality of customized audio experiences for a speaker system are disclosed. In other implementations, an at-home speaker system is configured for customized audio experiences.

In some particular aspects, a computer-implemented method of controlling a plurality of customized audio experiences for a speaker system includes: providing a user interface configured to accept user input for defining the customized audio experiences according to a set of at least two audio experience settings and at least one triggering mechanism; receiving the user input defining the customized audio experiences according to the set of at least two audio experience settings and the at least one triggering mechanism; and initiating audio playback from the speaker system according to one of the customized audio experiences in response to detecting the at least one triggering mechanism.

In other particular aspects, an at-home speaker includes: an acoustic transducer; at least one microphone; a communications module; and a control system coupled with the acoustic transducer, the at least one microphone and the communications module, the control system configured to: provide a user interface configured to accept user input for defining a plurality of customized audio experiences according to a set of at least two audio experience settings and at least one triggering mechanism; receive the user input defining the customized audio experiences according to the set of at least two audio experience settings and the at least one triggering mechanism; and initiate audio playback at the transducer according to one of the customized audio experiences in response to detecting the at least one triggering mechanism.

In additional particular aspects, a computer-implemented method of controlling a plurality of customized audio experiences in an at-home speaker system includes: providing a user interface configured to accept user input for defining the customized audio experiences according to a set of at least two audio experience settings and at least one triggering mechanism, where the user interface is presented on a smart device connected with the at-home speaker system; receiving the user input defining the customized audio experiences according to the set of at least two audio experience settings and the at least one triggering mechanism, where the user interface permits a user to assign the set of at least two audio experience settings and the at least one triggering mechanism to each of a plurality of customized audio experiences; and initiating audio playback from the at-home speaker system according to one of the customized audio experiences in response to detecting the at least one triggering mechanism.

Implementations may include one of the following features, or any combination thereof.

In certain implementations, the set of at least two audio experience settings includes two or more of: volume level settings of the speaker system, control feature settings on the speaker system, equalization settings of the audio playback at the speaker system, tone control settings of the audio playback at the speaker system, microphone settings on the speaker system, speaker grouping settings, input selection settings, content selection, content settings, rendering mode settings, virtual personal assistant settings or account settings.

In some aspects, the at least one triggering mechanism includes one or more of: a time of day, an identity of a user, detected motion proximate the speaker system, a detected ambient noise sound pressure level, an acoustic signature of detected ambient noise, an acoustic signature of the audio playback a genre of the audio playback or a voice command from a user.

In particular cases, at least one triggering mechanism includes user actuation at an interface located on the at-home speaker system or on a connected device.

In certain implementations, the user interface permits a user to assign the set of at least two audio experience settings and at least one triggering mechanism to each of a plurality of customized audio experiences.

In some aspects, the user interface permits the user to name the plurality of customized audio experiences for subsequent triggering.

In particular cases, the computer-implemented method further includes initiating distinct audio playback at speakers in distinct zones in the at-home speaker system.

In certain aspects, the at-home speaker system includes a plurality of speakers, and one of the plurality of speakers includes a master speaker and a remainder of the plurality of speakers include worker speakers.

In some implementations, the user interface is located on the at-home speaker, and the at least one triggering mechanism includes user actuation at the user interface.

In certain cases, the user interface includes actuatable preset buttons assignable to the customized audio experiences.

In particular aspects, the communications module is configured to communicate with a plurality of additional speakers in a speaker system.

In some implementations, the control system is further configured to initiate distinct audio playback at the at-home speaker and one of the plurality of additional speakers based upon distinct zones in the at-home speaker system.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

Figure 1:
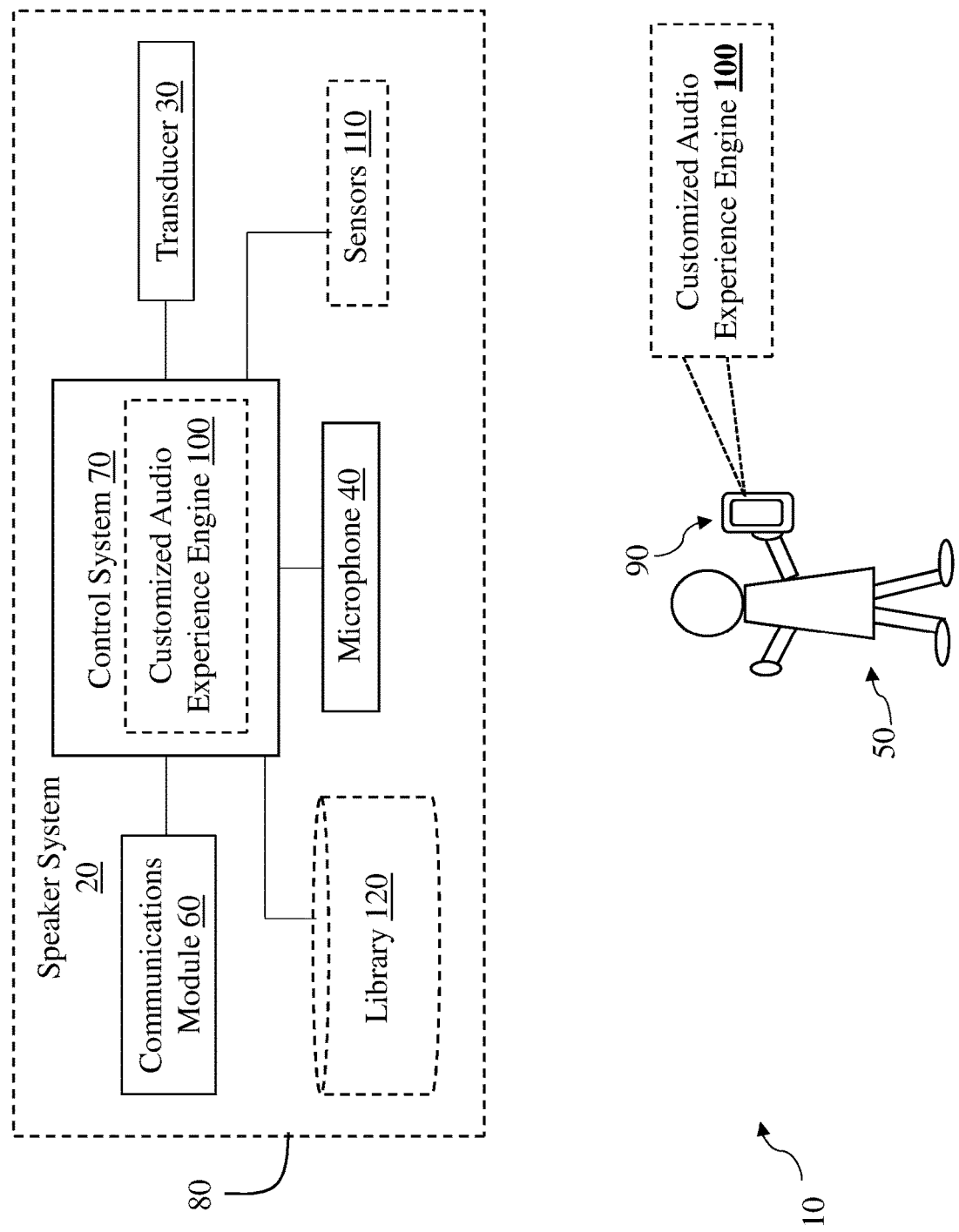
FIG. 1 is a schematic depiction of an environment illustrating a customized audio experience engine according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to speaker systems and related control methods. More particularly, aspects of the disclosure relate to controlling customized audio experiences for users of an audio device, such as an at-home speaker system.

Commonly labeled components in the FIGURES are considered to be substantially equivalent components for the purposes of illustration, and redundant discussion of those components is omitted for clarity.

Aspects and implementations disclosed herein may be applicable to a wide variety of speaker systems, e.g., a stationary or portable speaker system. In some implementations, a speaker system (e.g., a stationary speaker system such as a home audio system, soundbar, automobile audio system, or audio conferencing system, or a portable speaker system such as a smart speaker or hand-held speaker system) is disclosed. Certain examples of speaker systems are described as "at-home" speaker systems, which is to say, these speaker systems are designed for use in a predominately stationary position. While that stationary position could be in a home setting, it is understood that these stationary speaker systems could be used in an office, a retail location, an entertainment venue, a restaurant, an automobile, etc. In some cases, the speaker system includes a hard-wired power connection. In additional cases, the speaker system can also function using battery power. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of this disclosure or the scope of claim coverage.

Various particular implementations include computer-implemented methods of controlling a plurality of customized audio experiences for a speaker system. In various implementations, the process includes providing a user interface that is configured to accept user input for defining those customized audio experiences. In some cases, the customized audio experiences can be defined according to a set of at least two audio experience settings, and at least one triggering mechanism. The method can further include receiving the user input defining the customized audio experiences according to the audio experience settings and the triggering mechanism(s). In response to detecting the triggering mechanism(s), the method includes initiating audio playback from the speaker system according to one of the customized audio experiences.

These approaches and related speaker systems can enhance the user experience when compared with conventional systems and approaches. In particular, the approaches and speaker systems disclosed according to various implementations enable selection of customized audio experiences that account for a plurality of audio experience settings using one or more triggering mechanisms. In some examples, the user can initiate a plurality of customized audio experiences across one or more speakers using simple triggering mechanisms, such as playback of particular types of audio, motion proximate the speaker(s), voice command (s), etc. A variety of audio experience settings can be enveloped within each customized audio experience, for example, volume level settings, equalization settings, tone control settings, microphone settings, etc.

Conventional approaches and systems can require a user to set or adjust a number of audio experience settings for each experience. For example, a user wishing to hear particular music in his/her kitchen at dinnertime, conventionally initiates playback from a speaker system of the music type (e.g., "Assistant, play classical music"), and then adjusts other audio experience settings such as volume, equalization, virtual personal assistant (VPA) settings, etc. in a piece-by-piece approach. In this case, if the user has more than one VPA-enabled speaker within earshot of his/her voice command to initiate playback, that voice command could trigger unwanted playback from the additional VPA-enabled speakers. Additionally, the user may prefer to listen to dinnertime-type music at a volume setting that is lower than, say, music for entertaining his/her children during the morning or afternoon. Many conventional systems will initiate playback of the requested classical music at the same volume setting as the last-played audio. Even further, tone and equalization controls can enhance the playback of particular types of audio, and conventional systems will require the user to adjust these settings on a piece-by-piece basis.

In contrast to these conventional systems, the approaches and systems disclosed according to various implementations can provide customized audio experiences for one or more users according to a plurality of audio experience settings, using one or more triggering mechanisms. Using the example above, dinnertime music can be initiated according to various implementations based upon a triggering mechanism such as a voice command (e.g., "Assistant, please play dinnertime music"), user input (e.g., via a control feature of the speaker system or via an associated computer application), a detected time of day/day of the week (e.g., between 6:00 pm and 8:00 pm on weekdays), detected motion in the kitchen or dining area, and/or an acoustic signature of detected ambient noise (e.g., detecting the sound of the microwave running, or sizzling food in a pan). In certain cases, a plurality of triggering mechanisms can be used to more accurately match the customized audio experience with the user's preferences. For example, both time of day and motion in the kitchen can be used as threshold triggering mechanisms for playback of dinnertime music. The dinnertime music audio experience can be defined by audio experience settings, e.g., content (e.g., classical music), speaker grouping (e.g., playback initiated from only speakers in the kitchen), and volume (e.g., a background volume level, such as a level of 3/10 or 4/10). Using this example alone, it is clear that the approaches and systems according to the various disclosed implementations can significantly enhance the user experience when compared with conventional systems.

FIG. 1 shows an illustrative physical environment 10 including a speaker system 20 according to various implementations. As shown, the speaker system 20 can include an acoustic transducer 30 for providing an acoustic output to the environment 10. It is understood that the transducer 30 can include one or more conventional transducers, such as a low frequency (LF) driver (or, woofer) and/or a high frequency (HF) driver (or, tweeter) for audio playback to the environment 10. The speaker system 20 can also include at least one microphone 40 for receiving acoustic signals, such as voice commands from one or more users (one example user 50 shown). In some implementations, the microphone 40 includes a microphone array including a plurality of microphones. The microphone(s) 40 can be configured to receive voice commands from one or more users 50, as well as detect ambient acoustic signals proximate the speaker system 20.

The speaker system 20 can further include a communications module 60 for communicating with one or more other devices in the environment 10 and/or in a network (e.g., a wireless network). In some cases, the communications module 60 can include a wireless transceiver for communicating with other devices in the environment 10. In other cases, the communications module 60 can communicate with other devices using any conventional hard-wired connection and/or additional communications protocols. In some cases, communications protocol(s) can include a Wi-Fi protocol using a wireless local area network (WLAN), a communication protocol such as IEEE 802.11 b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In additional cases, the communications module 60 can enable the speaker system 20 to communicate with a remote server, such as a cloud-based server running an application for managing customized audio experiences. In various particular implementations, separately housed components in speaker system 20 are configured to communicate using one or more conventional wireless transceivers.

The speaker system 20 can further include a control system 70 coupled with the transducer 30, the microphone 40 and the communications module 60. As described herein, the control system 70 can be programmed to control one or more customized audio experiences. The control system 70 can include conventional hardware and/or software components for executing program instructions or code according to processes described herein. For example, control system 70 can include one or more processors, memory, communications pathways between components, and/or one or more logic engines for executing program code. Control system 70 can be coupled with the transducer 30, microphone 40 and/or communications module 60 via any conventional wireless and/or hardwired connection which allows control system 70 to send/receive signals to/from those components and control operation thereof. In various implementations, control system 70, transducer 30, microphone 40 and communications module 60 are collectively housed in a speaker housing 80 (shown optionally in phantom). However, as described herein, control system 70, transducer 30, microphone 40 and/or communications module 60 may be separately housed in a speaker system (e.g., speaker system 20) that is connected by any communications protocol (e.g., a wireless communications protocol described herein) and/or via a hard-wired connection.

For example, in some implementations, functions of the control system 70 can be managed using a smart device 90 that is connected with the speaker system 20 (e.g., via any wireless or hard-wired communications mechanism described herein). In some cases, the smart device 90 can include hardware and/or software for executing functions of the control system 70 to manage customized audio experiences. In particular cases, the smart device 90 includes a smart phone, tablet computer, smart glasses, smart watch or other wearable smart device, portable computing device, etc., and has an audio gateway, processing components, and one or more wireless transceivers for communicating with other devices in the environment 10. For example, the wireless transceiver(s) can be used to communicate with the speaker system 20, as well as one or more connected smart devices within communications range. The wireless transceivers can also be used to communicate with a server hosting a mobile application that is running on the smart device 90, for example, a customized audio experience engine 100.

The server can include a cloud-based server, a local server or any combination of local and distributed computing components capable of executing functions described herein. In various particular implementations, the server is a cloud-based server configured to host the customized audio experience engine 100, e.g., running on the smart device 90. According to some implementations, the customized audio experience engine 100 can be downloaded to the user's smart device 90 in order to enable functions described herein.

The customized audio experience engine 100 can be configured to initiate audio playback at the transducer 30 according to one of a plurality of customized audio experiences in response to detecting a corresponding triggering mechanism for that experience. According to various implementations, the customized audio experience engine 100 is configured to process data about triggering mechanisms received from one or more other components in the speaker system 20 or in connected devices (e.g., smart device 90). In some particular cases, the customized audio experience engine 100 is configured to process data relevant to triggering mechanisms, such as clock data indicating a time of day (and/or a day of the week), user identification data indicating an identity of the user 50 or other user(s) in the environment 10, motion detection data indicating motion proximate the speaker system 20, ambient noise sound pressure data (indicating a sound pressure level (SPL) of the ambient noise), acoustic signature data indicating an acoustic signature of detected ambient noise or an acoustic signature of audio playback at the transducer 30, playback identification data indicating a genre of the audio playback at the transducer and/or voice command data indicating a voice command received from the user 50 or other user(s) in the environment 10.

In various implementations, sensors 110 located at the speaker system 20 and/or the smart device 90 can be used for gathering data about triggering mechanisms. For example, the sensors 110 can include a vision system (e.g., an optical tracking system or a camera) for obtaining data to identify the user 50 or another user in the environment 10. The vision system can also be used to detect motion proximate the speaker system 20. In other cases, the microphone 40 (which may be included in the sensors 110) can detect ambient noise proximate the speaker system 20 (e.g., an ambient SPL), in the form of acoustic signals. The microphone 40 can also detect voice commands from the user 50. In additional implementations, audio processing components (e.g., digital signal processor(s), along with echo cancellation components) and/or other processing components can detect an acoustic signature of the audio that is played back at the transducer 30 (e.g., via playback signals sent to the transducer 30). In other cases, the acoustic signature of the audio can be detected using metadata from the audio file or audio stream that is rendered as playback at the transducer 30. In some cases, one or more processing components (e.g., central processing unit(s), digital signal processor(s), etc.), at the speaker system 20 and/or smart device 90 can process data from the sensors 110 to provide indicators of triggering mechanisms to the customized audio experience engine 100. Additionally, in various implementations, the customized audio experience engine 100 includes logic for processing data about one or more signals from the sensors 110, as well as user inputs to the speaker system 20 and/or smart device 90. In certain cases, the customized audio experience engine 100 is connected with a library 120 (e.g., a local data library or a remote library accessible via any connection mechanism herein), that includes triggering mechanism threshold values/ranges for use in detecting the triggering mechanism(s).

It is understood that library 120 can be a local library in a common geographic location as one or more portions of control system 70, or may be a remote library stored at least partially in a distinct location or in a cloud-based server. Library 120 can include a conventional storage device such as a memory, or can include a distributed and/or cloud-based storage device as described herein. It is further understood that library 120 can include data defining a plurality of triggering mechanism threshold values/ranges for a plurality of customized audio experiences from distinct users, profiles and/or environments. In this sense, library 120 could store triggering mechanism data that is applicable to specific users 50, profiles or environments, but may also store triggering mechanism data that can be used by distinct users 50, profiles or at other environments, e.g., where a set of experience settings is common or popular among multiple users 50, profiles and/or environments. In various implementations, library 120 can include a relational database including relationships between the triggering mechanism thresholds and triggering mechanism values, characteristics, etc. In some cases, library 120 can also include a text index for acoustic sources, e.g., with pre-set or user-definable categories. This could allow the user (e.g., in response to a prompt) to provide information about the type of triggering mechanism (e.g., a noise source, an acoustic signature), such as by selecting a type of the source from a menu (e.g., provided in a user interface). The control system 70 can further include a learning engine (e.g., a machine learning/artificial intelligence component such as an artificial neural network) configured to learn about the type of triggering mechanisms, e.g., from a group of users' triggering mechanisms such as noise sources (e.g., washing machines or vacuum cleaners).

Additional details of sensor types and detection mechanisms are provided in U.S. patent application Ser. No. 15/952,920 ("Intelligent Beam Steering in Microphone Array", filed on Apr. 13, 2018), which is herein incorporated by reference in its entirety.

Processes performed by the customized audio experience engine 100 (and the logic therein) are further described with reference to the flow diagram 200 in FIG. 2, and the illustrative user interface 300 shown schematically in FIG. 3.

Figure 2:
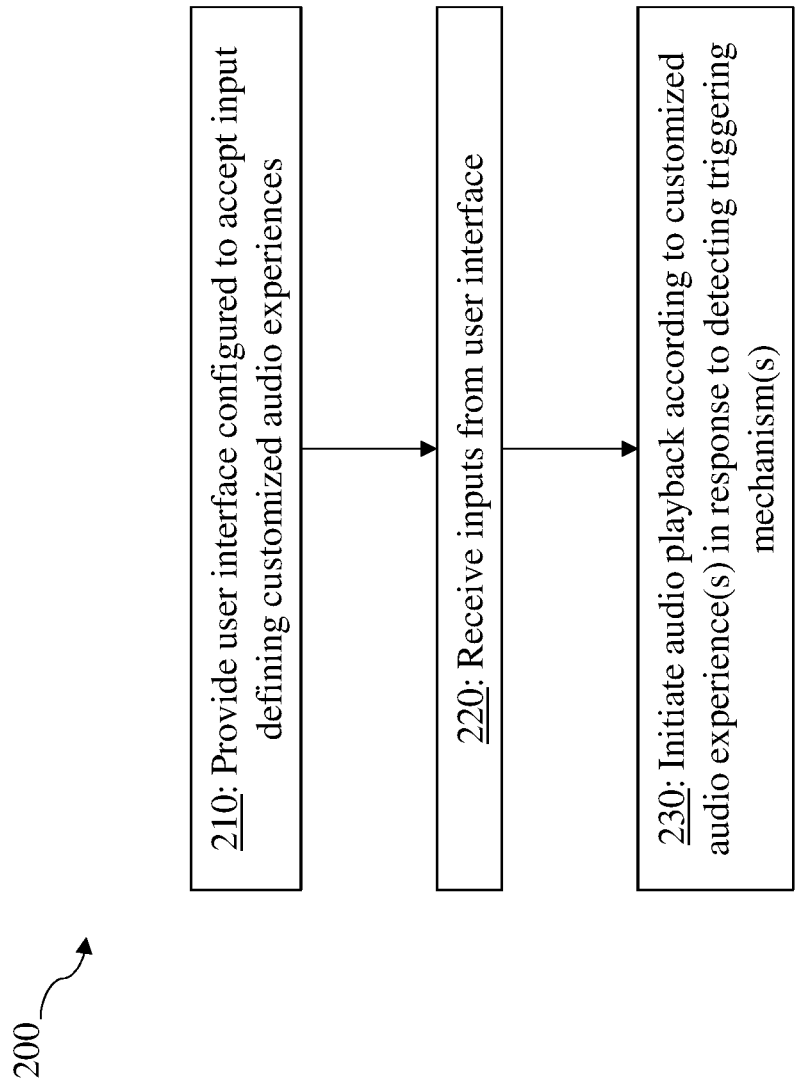
FIG. 2 is a flow diagram illustrating processes in managing customized audio experiences according to various implementations.
Figure 3:
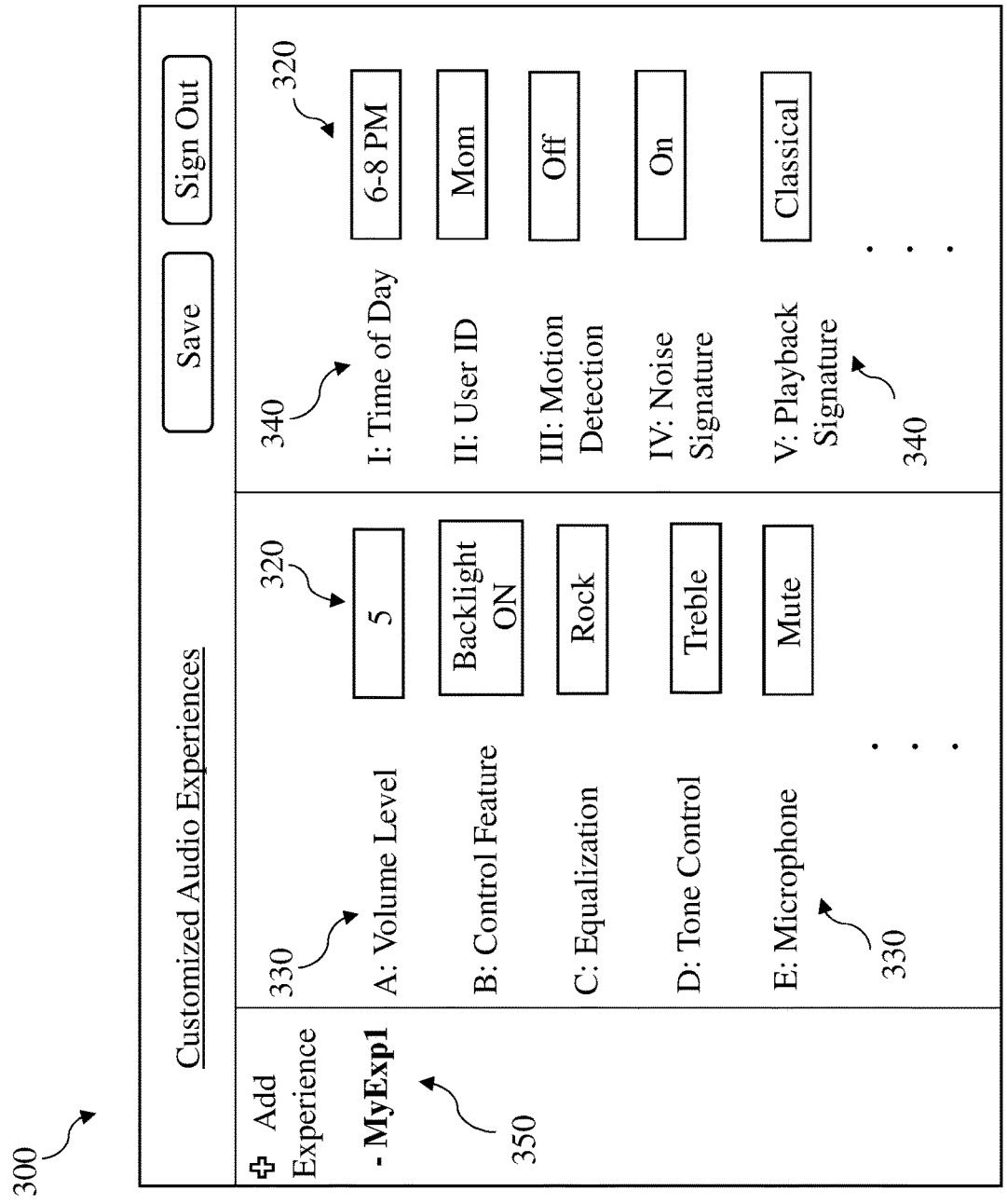
FIG. 3 depicts an example user interface for providing inputs to a customized audio experience engine according to various implementations.

As shown in process 210 in FIG. 2 and in the schematic depiction in FIG. 3, the customized audio experience engine 100 can be configured to provide a user interface 300 configured to accept user input for defining customized audio experiences. In some cases, the customized audio experience engine 100 presents (e.g., renders) the user interface 300 at the speaker system 20 (FIG. 1), e.g., on a display or other screen physically located on the speaker system 20. For example, the user interface 300 can be a temporary display on a physical display located at the speaker system 20, e.g., on a top or a side of the speaker housing. In other cases, the user interface 300 is a permanent interface having physically actuatable buttons for adjusting inputs and controlling other aspects of the customized audio experience(s). In other cases, the customized audio experience engine 100 presents (e.g., renders) the user interface 300 at the smart device 90 (FIG. 1), such as on a display or other screen on that smart device 90. The user interface 300 can be initiated at the smart device 90 as a software application (or, "app") that is opened or otherwise initiated through a command interface. Command interfaces on the speaker system 20 and/or smart device 90 can include haptic interfaces (e.g., touch screens, buttons, etc.), gesture-based interfaces (e.g., relying upon detected motion from an inertial measurement unit (IMU) and/or gyroscope/accelerometer/magnetometer) and/or a voice interface (e.g., a virtual personal assistant (VPA) interface).

As shown in FIG. 2, in process 220, the customized audio experience engine 100 is configured to receive the inputs 320 from the user at interface 300. As shown in FIG. 3, in some cases, the user interface 300 includes inputs 320 for defining the customized audio experiences according to at least two audio experience settings 330. In this example depiction, the user 50 can provide inputs 320 for several audio experience settings 330, as well as inputs 320 for at least one triggering mechanism 340. As described herein, each customized audio experience is defined by at least two settings 330. That is, each customized audio experience is defined by more than a single setting, such as a volume setting, or selected content. As described herein, these customized audio experiences can account for two, three, four or more settings to provide a streamlined, tailored audio presentation to the user 50. FIG. 3 illustrates several inputs 320 for settings 330 including:

A) Volume level (or, output volume) at speaker system 20. The user 50 may select an audio playback volume based upon a number of additional factors/settings, such as time of day (quieter playback in the mornings and/or evenings) or type of content (louder playback for cooking instructions than for classical music). In some cases, where multiple speaker devices are used for audio output, volume level settings can be used to control the volume level at each of the distinct speaker devices.

B) Control feature settings on the speaker system 20. In some cases, control feature settings can include whether one or more control features are enabled/disabled, whether corresponding lights are illuminated (or other display features are engaged), and/or how the control feature(s) function, e.g., a multi-function button can have distinct functions based upon an additional factor such as a time of day.

C) Equalization settings of the audio playback at the speaker system 20. For example, equalization settings for selected content (e.g., an audio book) can differ from equalization settings for other selected content (e.g., rock music). In some cases, equalization settings can include presets, such as "Rock", "Jazz" or "Concert". In other cases, equalization settings can allow the user to adjust values for particular frequencies.

D) Tone control settings of the audio playback at the speaker system 20. Similarly to equalization settings, tone control settings can be varied for distinct types of selected content. In some cases, these tone control settings can include presets like "Treble" or "Bass", indicating a shift toward a greater value for one of those settings. In other cases, tone control settings can allow the user to adjust values for particular tone controls, e.g., setting a level (value) for bass and/or treble.

E) Microphone settings on the speaker system 20. In some cases, the settings can enable microphone muting, such as where a user 50 elects to disable the microphone in particular settings. For example, the user 50 may wish to disable the microphone in a party setting in order to avoid accidentally triggering a VPA command while music is playing at the speaker system 20.

Additional audio experience settings not shown can include:

F) Speaker grouping settings. These settings can define which speakers in a set of two or more speakers are grouped under particular playback conditions. For example, where a user 50 has speakers in multiple rooms (or zones) in a home, two speakers in the kitchen and living room, respectively, can be grouped in a "party" experience because guests are most likely to be in those rooms (as compared with a speaker in a bedroom). As another example, the grouping settings could determine whether or not two or more speakers are paired (e.g., in a left-right stereo pair or paired in a surround sound system, such as 3.0, 3.1, 5.0, or 5.1 systems).

G) Input selection settings. These can include which inputs at the speaker system 20 are enabled during particular experiences. For example, the customized audio experience engine 100 can disable inputs based upon the input selection settings. One particular example can include disabling fast-forward or skip functions during audio playback of educational content (e.g., a lecture series, or an audio exam).

H) Content selection settings. These settings can allow the user 50 to assign particular content to an experience, e.g., an audio book during a "reading" experience, or a particular playlist, or streaming radio station during a "party" experience. As noted herein, content can also be assigned to distinct times of day, days of the week, speaker group(s), etc.

I) Content settings. These settings can include controlling content selection options for playback based upon the customized audio experience. In some cases, the user 50 could restrict content options during a particular period (e.g., no pop music during study time, or after a certain hour), or designate content options for a particular period (e.g., classical music and instrumental music is selectable during the breakfast hour). These content settings can also include limiting types of content for playback, e.g., limiting playback with explicit content.

J) Rendering mode settings. These can include setting particular speaker modes such as "dialog" mode (e.g., enabling microphone array for ongoing virtual personal assistant (VPA) interaction), "night" mode (e.g., audio compression control such that dialog and ambient sounds are audible, while louder sounds such as explosions, are heavily compressed), etc. Additionally, the rendering mode settings can be used to define playback controls (e.g., volume, tone, etc.) for multiple speakers used for playback, such as playback controls for surround sound playback or center speaker playback (e.g., in an entertainment center setting).

K) Virtual personal assistant (VPA) settings. These can include controls for enabling/disabling VPA interaction, such as during a party. These can also include controls for adjusting pickup functions of the VPA, for example, where a user 50 makes most of his/her commands to the VPA from a particular location, the VPA settings can pre-direct the microphone(s) to enhance pickup from that location. Conversely, noise sources can be nulled, e.g., by locating an appliance or other noise generating device relative to the speaker system 20. VPA settings can also be configured to limit functions for particular users, e.g., based upon detected voice signatures. VPA settings can also be configured to limit pickup of voice commands and other acoustic signals in a "privacy" setting, such that when the privacy setting is in effect, the VPA is completely disabled. This can prevent unwanted transmission of in-home acoustics to VPA managing/hosting entities.

L) Account settings. These can include assigning particular settings to a user account, such as in a household with multiple users. The account settings can include profile information about the user(s), e.g., age, playback genre likes/dislikes, links to sources of playback such as streaming or other Internet radio stations, etc.

FIG. 3 also illustrates several inputs 320 for the triggering mechanism(s) 340, which can include one or more of:

I) A time of day. In various implementations, the set of audio experience settings 330 (e.g., two or more of settings A-L) can be assigned to a time of day, day of the week, or a period of time/days. For example, as noted herein, audio experience settings 330 such as volume level and content selection can be assigned to a time of day (e.g., mid-to-low volume level and Internet radio station of "classical music" is played at 6:00 AM on weekdays).

II) An identity of a user 50. In various implementations, the audio experience settings can be assigned to an identity of a user 50, such as "Dad" or "Mom" or "Uncle Eric." The user's identity can be detected according to various mechanisms described herein, e.g., visual or audio signature detection using sensors 110, in response to a voice query asking for identification information, in response to a login using the customized audio experience engine 100, or in response to detecting a smartphone 90 associated with a user's identity in proximity to the speaker system 20. The user's identity can be tied to content selection (e.g., favorite Internet radio stations), content settings (e.g., parental controls or limitations on explicit content), volume level settings (e.g., Dad enjoys playback louder than Mom), speaker grouping settings (e.g., Uncle Eric likes playback from all speakers in the house), etc.

III) Detected motion proximate the speaker system 20 (e.g., using sensors 110). In some examples, sensors 110 at the speaker system 20 and/or at a connected smart device 90 can detect motion proximate the speaker system 20, e.g., using a camera and/or microphone(s). In these cases, the customized audio experience engine 100 can implement particular VPA settings when detecting motion proximate the speaker system 20 (e.g., to directionalize the microphone(s), or enable VPA), adjust volume level settings when detecting motion proximate the speaker system 20 (e.g., reduce the playback volume when motion is detected within a particular range), etc.

IV) An acoustic signature of detected ambient noise. In these cases, the customized audio experience engine 100 can implement settings based upon the acoustic signature of detected ambient noise. For example, when the microphone(s) 40 (FIG. 1) detect ambient noise with a signature matching a known signature, the customized audio experience engine 100 can implement corresponding settings, e.g., "cooking" playlist or station, at a mid-to-high volume setting can be triggered when the acoustic signature of a sizzling pan or oven timer is detected.

V) An acoustic signature of audio playback. For example, the customized audio experience engine 100 can analyze playback signals sent to the transducer 30 to detect that the acoustic signature of the audio playback includes playback of classical music with woodwind or string instruments. In other cases, the customized audio experience engine 100 can detect the acoustic signature of the audio playback using metadata in the audio file or stream that is rendered as playback at the transducer 30. The user 50 can assign particular equalization settings, volume settings, etc. to this audio playback based upon detecting the acoustic signature(s).

Additional triggering mechanisms not shown can include:

VI) A genre of the audio playback. Similarly to the acoustic signature of the audio playback, the customized audio experience engine 100 can apply speaker system 20 settings associated with particular genres of audio playback. In some cases, the customized audio experience engine 100 can receive data from an audio content source (e.g., Internet radio station provider or stored music library) or metadata about playback content, and apply settings as assigned via the interface 300. For example, the interface 300 enables the user 50 to assign particular equalization settings, volume settings, etc. to audio playback based upon the genre, e.g., louder playback and more bass for pop or rap music as compared with classical music, talk radio or television audio playback.

VII) A voice command from the user 50. In these cases, the customized audio experience engine 100 enables the user 50 to implement a customized audio experience having multiple settings (e.g., from settings A-L) with a voice command. In some cases, the voice command can include a command directly affiliated with a saved experience (e.g., "Assistant, play 'dinner' music" to trigger the "Dinner" experience), while in other cases, the voice command is an approximation or generalization of a saved experience (e.g., "Assistant, play relaxing music" to trigger a suggested "Nighttime" or "Mellow" experience). In any case, the user 50 can assign voice commands, or general phrases to the customized audio experiences using the interface 300.

Figure 4:
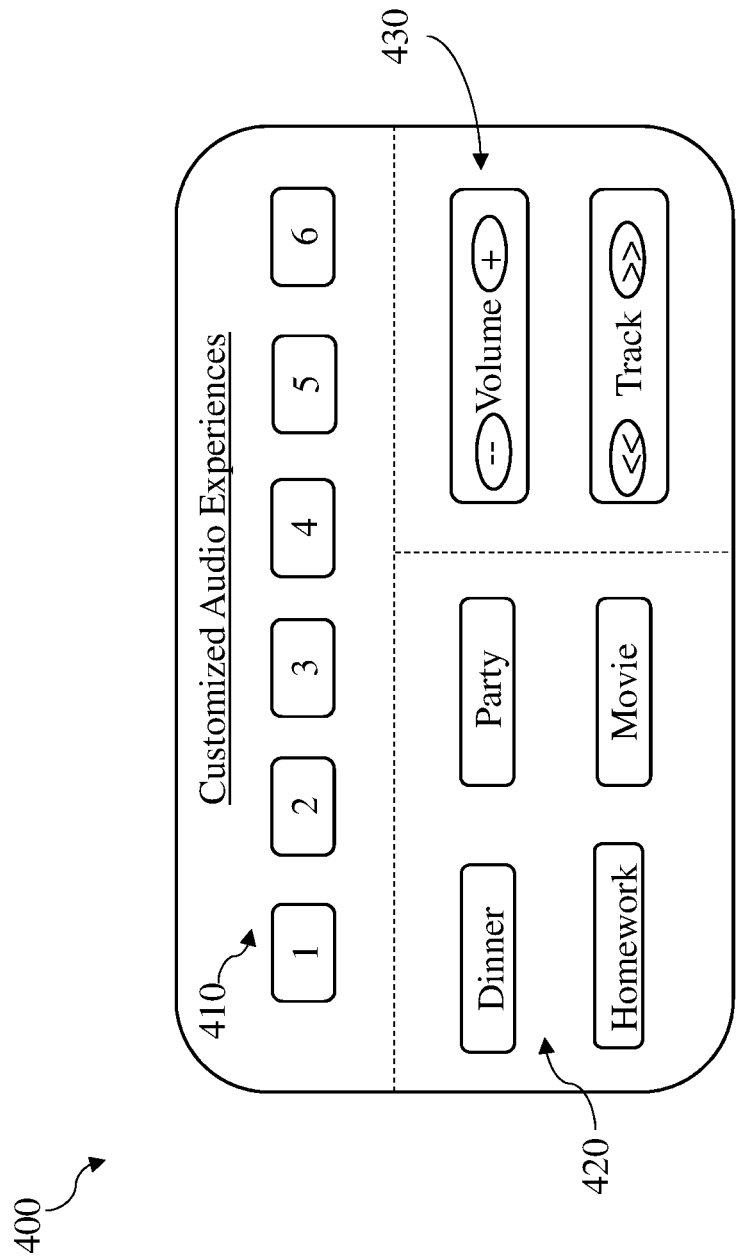
FIG. 4 depicts an example user interface for actuating customized audio experiences according to various implementations.

In addition to the above-noted triggering mechanisms, in some implementations, the triggering mechanism for one or more customized audio experiences can include user actuation at an interface located on the speaker system 20 or on a connected device such as the smart device 90. In some cases, the interface located on the speaker system 20 and/or the smart device 90 is distinct from the interface 300 (FIG. 3) for defining the customized audio experiences. That is, as shown in FIG. 4, an example interface 400 is illustrated for triggering customized audio experiences that are defined using inputs from the interface 300. In some cases, this interface 400 is located on a display at the speaker system 20 and/or the smart device 90. In other cases, the interface 400 is simplified and actuation can be performed using a number of preset buttons 410, which can be rendered on a digital display (e.g., touch screen) such as on the speaker system 20 and/or smart device 90, or can be assigned to a number of permanent physical buttons on the speaker system 20. In other cases, text buttons 420 (e.g., with modifiable display characteristics) can be used to allow for selection and switching between customized audio experiences. The interface 400 can also include additional controls 430, such as volume, track backward/forward, etc.

Returning to FIG. 3, in various implementations, the interface 300 allows the user to assign settings 330 and a corresponding triggering mechanism 340 to a plurality of customized audio experiences. That is, the interface 300 allows the user to define a plurality of customized audio experiences, which can share some common settings 330 and/or triggering mechanisms 340, or may have completely distinct settings 330 and triggering mechanisms 340. In some cases, as shown in FIG. 3, the interface 300 includes a naming input 350, which can help the user with later recall and/or VPA commands. In some cases, the naming input 350 allows the user to subsequently trigger the customized audio experience with a corresponding name.

Returning to FIG. 2, in process 230, in response to detecting the triggering mechanism(s), the customized audio experience engine 100 is configured to initiate audio playback from the speaker system 20 according to one of the customized audio experiences. As noted herein, the customized audio experience engine 100 is configured to evaluate data relating to the triggering mechanisms using inputs from one or more data sources, for example, device functions of the speaker system 20 and/or smart device 90, applications running on the speaker system 20 and/or smart device 90, as well as data from one or more sensors 110. In some cases, process 230 includes sub-processes (not shown), including:

Process 230A: receive data about at least one triggering mechanism. This process can include receiving sensor data from sensors 110 (e.g., detecting motion proximate the speaker system 20, or voice pickup proximate the speaker system 20), device function data from the speaker system 20 (e.g., clock data indicating a time of day) and/or application data from an application running on the speaker system 20 and/or smart device 90 (e.g., an Internet radio application playing a particular song or genre of playback). Various additional examples of triggering mechanism data are described herein.

Process 230B: compare the received data with a corresponding triggering mechanism threshold (or condition). In some cases, the customized audio experience engine 100 is configured to compare the data about the triggering mechanism with stored data, e.g., in the library 120 (FIG. 1). The triggering mechanism threshold(s)/condition(s) can include numerical values (e.g., time(s) of day), as well as numerical ranges (e.g., ranges of user movement indicating a lasting presence in the room, ranges of time or days) and/or characteristics (e.g., genres of playback, or identities of users).

Process 230C1: where the received data satisfies the corresponding triggering mechanism threshold/condition, the customized audio experience engine 100 is configured to initiate audio playback at the speaker system 20 according to the corresponding customized audio experience.

Process 230C2: where the received data does not satisfy any triggering mechanism threshold/condition, the customized audio experience engine 100 is configured to stay in a query mode (e.g., to receive additional triggering mechanism data), or revert to a dormant state until additional triggering mechanism data is received.

Figure 5:
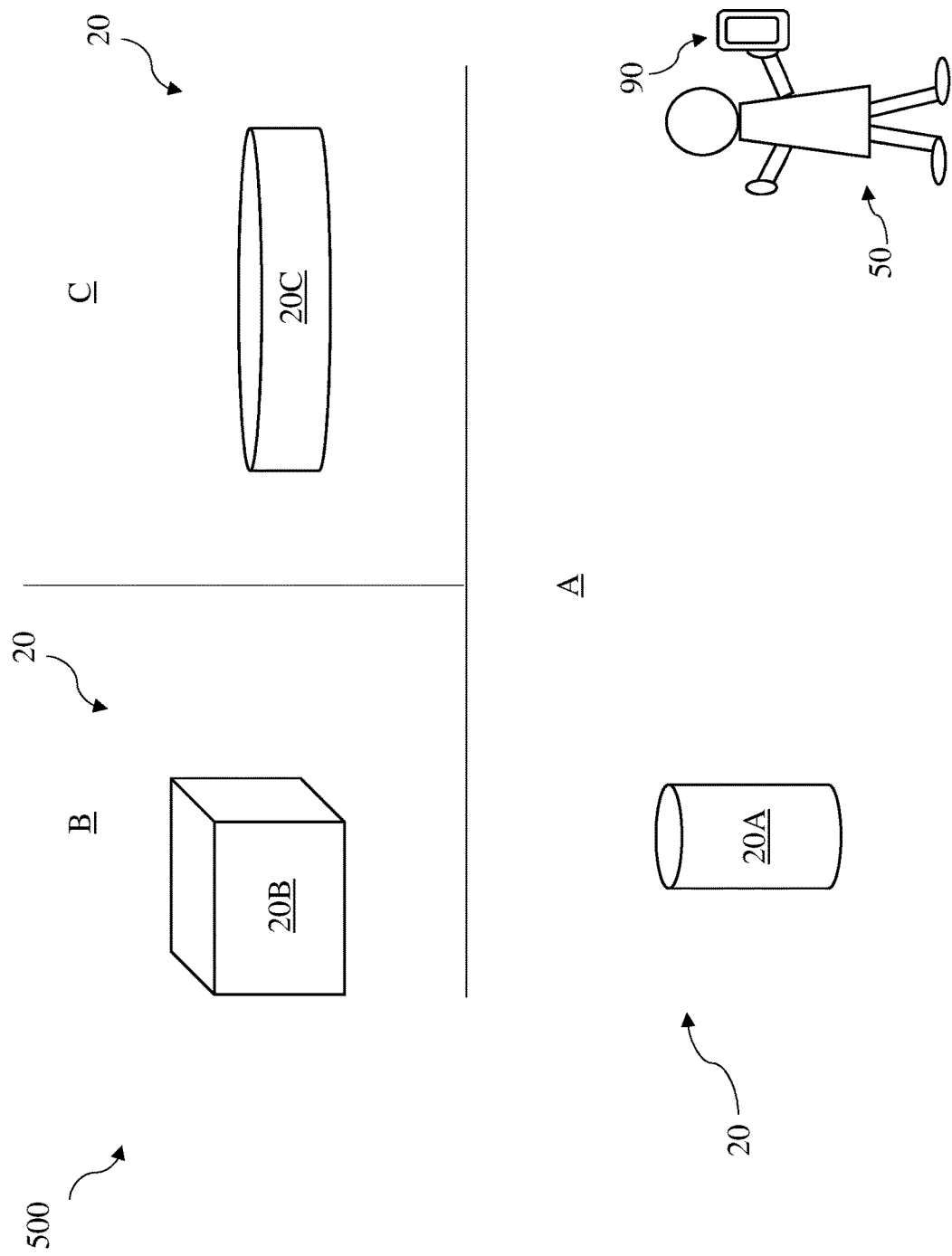
FIG. 5 is a schematic depiction of an environment having multiple speakers in distinct zones, according to various implementations.

FIG. 5 shows an environment 500 illustrating an additional implementation where the speaker system 20 includes a plurality of speakers 20A, 20B, 20C, etc. located in distinct zones A, B, C, etc. In this implementation, zones A, B, C, etc. can represent distinct physical rooms or partitioned spaces within the environment 500 (e.g., rooms in a home, divided spaces within a room). In various implementations, as noted herein, the customized audio experience engine 100 can be configured to initiate distinct audio playback at speakers 20A, 20B, 20C in distinct zones in the system 20. For example, the customized audio experience engine 100 can initiate a customized audio experience including playback of television audio at a speaker (e.g., speaker 20A) in an entertainment room, based upon the content of the television program, users present in the room, or another triggering mechanism described herein. At the same time, the customized audio experience engine 100 can initiate a distinct customized audio experience including playback of a "Cooking" music playlist at a distinct speaker (e.g., 20C) in the kitchen, based upon a user command (e.g., "Assistant, play 'Cooking' playlist") or the detected acoustic signature of food sizzling in a pan.

In some scenarios, the plurality of speakers 20A, 20B, 20C includes a master speaker (e.g., speaker 20A) and worker speakers (e.g., speakers 20B, 20C). In these cases, the customized audio experience engine 100 can run locally at the master speaker 20A or otherwise communicate with the master speaker 20A, and the master speaker 20A can send control commands to the worker speakers 20B, 20C to coordinate customized audio experiences. In these cases, the worker speakers 20B, 20C can be used as add-on speaker elements to coordinate the customized audio experiences. In some cases, these worker speakers 20B, 20C may not be directly linked to the customized audio experience engine 100 or the smart device 90. In certain examples, the worker speakers 20B, 20C can communicate with the master speaker 20A using any local communications protocol described herein (e.g., Bluetooth, Wi-Fi, Zigbee, RF, etc.).

Additional implementations of the speaker system 20 can utilize data inputs from external devices, including, e.g., one or more personal audio devices, smart devices (e.g., smart wearable devices, smart phones), network connected devices (e.g., smart appliances) or other non-human users (e.g., virtual personal assistants, robotic assistant devices). External devices can be equipped with various data gathering mechanisms providing additional information to control system 70 about the environment proximate the speaker system 20. For example, external devices can provide data about the location of one or more users 50 in environment 10, the location of one or more acoustically significant objects in environment (e.g., a couch, or wall), or high versus low trafficked locations. Additionally, external devices can provide identification information about one or more noise sources, such as image data about the make or model of a particular television, dishwasher or espresso maker. Even further, external devices can provide information about schedule(s) and/or calendar(s) for one or more users 50 and/or locations. For example, a scheduled event on a calendar can be used as a triggering mechanism (e.g., scheduled "dinner party"). Examples of external devices such as beacons or other smart devices are described in U.S. patent application Ser. No. 15/687,961 ("User-Controlled Beam Steering in Microphone Array", filed on Aug. 28, 2017), which is herein incorporated by reference in its entirety.

While data inputs from various external devices are described herein, it is understood that in various implementations, the customized audio experience engine 100 can be configured to prompt the user for confirmation to begin, end and/or transition between customized audio experiences. In certain cases where a direct command from the user 50 (e.g., voice command or interface command) is not used to trigger a customized audio experience, the customized audio experience engine 100 is configured to prompt the user for confirmation about a customized audio experience change, e.g., "I see you have a dinner party scheduled, would you like to begin your 'dinner party' audio experience?" In additional implementations, the user 50 can define settings via the customized audio experience engine 100 to require explicit approval to begin, end or otherwise change a customized audio experience. In some cases, the user 50 can selectively require approval to control customized audio experiences, for example, requiring approval for adjustments made according to triggers from calendar-based or schedule-based experiences, while not requiring approval for adjustments made according to triggers from noise signature or playback signature.

In various implementations, the speaker system(s) and related approaches for creating customized audio experiences improve on conventional audio playback mechanisms. For example, the customized audio experience engine 100 has the technical effect of enabling efficient definition and implementation of customized audio experiences.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

I claim:

1. A computer-implemented method of controlling a plurality of customized audio experiences for an at-home speaker system, the method comprising:
   providing a user interface configured to accept user input for defining the customized audio experiences according to a set of at least two audio experience settings and at least one triggering mechanism, wherein the at least one triggering mechanism comprises a time of day, a day of the week or a period of time;
   receiving the user input defining the customized audio experiences according to the set of at least two audio experience settings and the at least one triggering mechanism; and
   initiating audio playback from the speaker system according to one of the customized audio experiences in response to detecting the at least one triggering mechanism,
   wherein one of the customized audio experiences comprises a party experience, wherein the set of at least two audio experience settings comprises at least one of: microphone settings on the speaker system or virtual personal assistant (VPA) settings, wherein in the party experience:
      the VPA settings pre-direct the microphones to enhance pickup from a location where a user is known to commonly make VPA commands.

2. The computer-implemented method of claim 1, wherein the set of at least two audio experience settings comprise two or more of: volume level settings of the speaker system, control feature settings on the speaker system, equalization settings of the audio playback at the speaker system, tone control settings of the audio playback at the speaker system, microphone settings on the speaker system, speaker grouping settings, input selection settings, content selection, content settings, rendering mode settings, virtual personal assistant settings or account settings, and
   wherein the at least one triggering mechanism further comprises one or more of: an identity of a user, detected motion proximate the speaker system, a detected ambient noise sound pressure level, an acoustic signature of detected ambient noise, an acoustic signature of the audio playback, a genre of the audio playback or a voice command from a user.

3. The computer-implemented method of claim 2, wherein the set of at least two audio experience settings are configured to vary based on the time of day, the day of the week, or the period of time.

4. The computer-implemented method of claim 1, wherein the at least one triggering mechanism further comprises user actuation at an interface located on the speaker system or on a connected device.

5. The computer-implemented method of claim 1, wherein the user interface permits a user to assign the set of at least two audio experience settings and the at least one triggering mechanism to each of a plurality of customized audio experiences, wherein the user interface further permits the user to name the plurality of customized audio experiences for subsequent triggering.

6. The computer-implemented method of claim 1, further comprising initiating distinct audio playback at speakers in distinct zones in the speaker system, wherein the distinct audio playback is determined by at least one of: content of the audio playback or detected presence of a user in one of the distinct zones; and a characteristic of each of the distinct zones.

7. The computer-implemented method of claim 1, wherein the speaker system comprises a plurality of speakers, and wherein one of the plurality of speakers comprises a master speaker and a remainder of the plurality of speakers comprise worker speakers.

8. An at-home speaker comprising:
   an acoustic transducer;
   at least one microphone;
   a communications module; and
   a control system coupled with the acoustic transducer, the at least one microphone and the communications module, the control system configured to:
      provide a user interface configured to accept user input for defining a plurality of customized audio experiences according to a set of at least two audio experience settings and at least one triggering mechanism, wherein the at least one triggering mechanism comprises a time of day, a day of the week or a period of time;
      receive the user input defining the customized audio experiences according to the set of at least two audio experience settings and the at least one triggering mechanism; and
      initiate audio playback at the transducer according to one of the customized audio experiences in response to detecting the at least one triggering mechanism,
      wherein the at least one triggering mechanism comprises a plurality of triggering mechanisms, wherein one of the customized audio experiences comprises a dinnertime music audio experience, wherein a first triggering mechanism comprises a time of day and a second triggering mechanism comprises detecting motion proximate the speaker in a kitchen or dining area, and wherein in response to detecting that all of the triggering mechanisms are satisfied, audio playback of dinnertime music is initiated at the speaker system at a background volume level, and
      wherein the set of at least two audio experience settings comprises virtual personal assistant (VPA) settings, wherein in the dinnertime music audio experience:
         the VPA settings pre-direct the microphones to enhance pickup from a location where a user is known to commonly make VPA commands.

9. The at-home speaker of claim 8, wherein the user interface is located on the at-home speaker, and wherein the at least one triggering mechanism comprises user actuation at the user interface, wherein the user interface comprises actuatable preset buttons assignable to the customized audio experiences.

10. The at-home speaker of claim 8, wherein the user interface permits a user to assign the set of at least two audio experience settings and the at least one triggering mechanism to each of a plurality of customized audio experiences in the set, wherein the user interface permits the user to name the plurality of customized audio experiences for subsequent triggering.

11. The at-home speaker of claim 8, wherein the communications module is configured to communicate with a plurality of additional speakers in a speaker system,
   wherein the control system is further configured to initiate distinct audio playback at the at-home speaker and one of the plurality of additional speakers based upon distinct zones in the at-home speaker system, wherein the distinct audio playback is determined by at least one of: content of the audio playback or detected presence of a user in one of the distinct zones; and a characteristic of each of the distinct zones.

12. The at-home speaker of claim 11, wherein the at-home speaker comprises a master speaker and the plurality of additional speakers comprise worker speakers.

13. The at-home speaker system of claim 8, wherein the at least one triggering mechanism further comprises detected motion proximate the speaker, and wherein the audio playback is initiated at the transducer according to one of the customized audio experiences only in response to detecting that all of the triggering mechanisms are satisfied.

14. A computer-implemented method of controlling a plurality of customized audio experiences for a speaker system, the method comprising:
   providing a user interface configured to accept user input for defining the customized audio experiences according to a set of at least two audio experience settings and at least one triggering mechanism, wherein the at least one triggering mechanism comprises a time of day, a day of the week or a period of time;
   receiving the user input defining the customized audio experiences according to the set of at least two audio experience settings and the at least one triggering mechanism;
   initiating audio playback from the speaker system according to one of the customized audio experiences in response to detecting the at least one triggering mechanism,
   wherein the set of at least two audio experience settings comprise two or more of: volume level settings of the speaker system, control feature settings on the speaker system, equalization settings of the audio playback at the speaker system, tone control settings of the audio playback at the speaker system, microphone settings on the speaker system, speaker grouping settings, input selection settings, content selection, content settings, rendering mode settings, virtual personal assistant settings or account settings,
   wherein the at least one triggering mechanism further comprises one or more of: an identity of a user, detected motion proximate the speaker system, a detected ambient noise sound pressure level, an acoustic signature of detected ambient noise, an acoustic signature of the audio playback, a genre of the audio playback or a voice command from a user,
   wherein the set of at least two audio experience settings are configured to vary based on the time of day, the day of the week, or the period of time,
   wherein in at least one of the customized audio experiences: the microphone settings pre-direct the microphones to enhance pickup from a location where a user is known to commonly make virtual personal assistant (VPA) commands; and
   initiating distinct audio playback at speakers in distinct zones in the speaker system, wherein the distinct audio playback is determined by:
      a) at least one of: content of the audio playback or detected presence of a user in one of the distinct zones; and
      b) a characteristic of each of the distinct zones.

15. The computer-implemented method of claim 14, wherein the speaker system comprises a plurality of speakers in the distinct zones, and wherein one of the plurality of speakers comprises a master speaker and a remainder of the plurality of speakers comprise worker speakers.

* * * * *